US006154694A

United States Patent [19]
Aoki et al.

[11] Patent Number: 6,154,694
[45] Date of Patent: Nov. 28, 2000

[54] DATA CARRIER SYSTEM

[75] Inventors: Hisashi Aoki; Shinichi Koga, both of Niwa-gun, Japan

[73] Assignee: Kabushiki Kaisha Tokai Rika Denki Seisakusho, Niwa-gun, Japan

[21] Appl. No.: 09/307,778

[22] Filed: May 10, 1999

[30] Foreign Application Priority Data

May 11, 1998 [JP] Japan .................................. 10-127425

[51] Int. Cl.[7] ...................................................... G06F 19/00

[52] U.S. Cl. ............................. 701/35; 701/32; 307/10.2; 307/10.3; 307/10.4; 307/10.5

[58] Field of Search ................................. 701/35, 36, 32, 701/30; 340/286.01, 426, 825, 825.31, 438; 290/33–35; 307/10.3, 10.2, 10.4, 10.5

[56] References Cited

U.S. PATENT DOCUMENTS 5,430,432 7/1995 Camhi et al. ........................... 340/438
5,798,576 8/1998 Ostermann et al. ................... 307/10.3
5,912,512 6/1999 Hayashi et al. ........................ 307/10.5
6,025,653 2/2000 Hayashi et al. ........................... 290/33

*Primary Examiner*—William A. Cuchlinski, Jr.
*Assistant Examiner*—Ronnie Mancho
*Attorney, Agent, or Firm*—Morgan, Lewis & Bockius LLP

[57] ABSTRACT

An electrical control unit for a vehicle successively writes operation data of the vehicle in a transponder provided in a key used for starting the vehicle. At the same time, the electric control unit successively writes the same operation data in a memory area of a non-volatile memory corresponding to a key used for starting the engine. When the key is lost, the engine is started under the condition that the identification of the lost key is written in a replacement key. Then, the electric control unit of the vehicle writes operation data stored in the non-volatile memory corresponding to the lost key in the replacement key. At the same time, the electric control unit of the vehicle moves the operation data to a memory area corresponding to the replacement key. Accordingly, when the operation data is read from the replacement key, operation data stored in the lost key can be managed.

6 Claims, 7 Drawing Sheets

FIG. 3

8

| FIRST KEY | SECOND KEY | THIRD KEY |
|---|---|---|
| ID CODE 1 | ID CODE 2 | ID CODE 3 |
| R/W RENEWAL INFORMATION | R/W RENEWAL INFORMATION | R/W RENEWAL INFORMATION |
| ADDRESS TO START WRITING OF KEY | ADDRESS TO START WRITING OF KEY | ADDRESS TO START WRITING OF KEY |
| KEY LOSS INFORMATION<br>• IS THERE A LOST KEY OR NOT?<br>• WHICH KEY IS LOST? | KEY LOSS INFORMATION<br>• IS THERE A LOST KEY OR NOT?<br>• WHICH KEY IS LOST? | KEY LOSS INFORMATION<br>• IS THERE A LOST KEY OR NOT?<br>• WHICH KEY IS LOST? |
| OPERATION DATA BACKUP AREA | OPERATION DATA BACKUP AREA | OPERATION DATA BACKUP AREA |

FIG. 8

8

| FIRST KEY | SECOND KEY | THIRD KEY |
| --- | --- | --- |
| ID CODE 1 | ID CODE 2 | ID CODE 3 |
| R/W RENEWAL INFORMATION | R/W RENEWAL INFORMATION | R/W RENEWAL INFORMATION |
| ADDRESS TO START WRITING OF KEY | ADDRESS TO START WRITING OF KEY | ADDRESS TO START WRITING OF KEY |
| KEY LOSS INFORMATION<br>• IS THERE A LOST KEY OR NOT?<br>• WHICH KEY IS LOST? | KEY LOSS INFORMATION<br>• IS THERE A LOST KEY OR NOT?<br>• WHICH KEY IS LOST? | KEY LOSS INFORMATION<br>• IS THERE A LOST KEY OR NOT?<br>• WHICH KEY IS LOST? |
| | A | |

DATA CARRIER SYSTEM

BACKGROUND OF INVENTION

1. Field of Invention

The present invention relates to a data carrier system for managing operation data of a vehicle by utilizing a data carrier.

2. Related Art

Recently, in order to improve operation control of a vehicle, a data carrier system has been investigated. An example of this data carrier system is composed as follows. When a key having a built-in memory is inserted into an ignition key cylinder of a vehicle so that an engine is started, a control unit provided in the vehicle stores operation data of the vehicle such as start time of the engine, stop time of the engine and running speed of the vehicle in the key with a built-in memory.

On the other hand, a reader can be provided in an office. When a personal computer is operated under the condition that the key with a built-in memory is set in the reader, the personal computer reads operation data from the key, and at the same time the operation data, which has already been stored in the key, is erased.

Accordingly, when the key with a built-in memory is used as a medium, operation data of the vehicle can be taken in to the personal computer. Therefore, it is possible to make a daily report according to the operation data stored in the personal computer, and it is also possible to conduct vehicle maintenance and personnel management. Further, it is possible to conduct operation control of the vehicle when the data is stored in a floppy disk and others.

However, when the above arrangement is adopted, the following problems may be encountered. In case of losing the key, with a built-in memory it is impossible to restore the operation it data stored in the key. Therefore, problems may be caused in operation control of the vehicle.

SUMMARY OF INVENTION

The present invention has been accomplished in view of the above circumstances. It is an object of the present invention to provide a data carrier system capable of positively managing operation data even if the data carrier is lost.

A data carrier system of the present invention comprises: a plurality of portable data carriers which are distinguished from each other; a writing means for writing operation data of a vehicle into a memory area of the data carrier in which the operation data can be written under the condition that the data carrier is set at a predetermined position of the vehicle and also for writing the same operation data in a memory means corresponding to the data carrier; a management means for reading the operation data stored in the data carrier and erasing the operation data stored in the data carrier; and a lost information writing means for writing the identification of a lost data carrier into a replacement data carrier, wherein the writing means writes the operation data stored in the memory means corresponding to the lost data carrier into the replacement data carrier, and the operation data is made to correspond to the replacement data carrier for relief.

According to the above arrangement, when a user sets a data carrier at a predetermined position in a vehicle, a writing means stores operation data of the vehicle in a writable memory area of the data carrier. At the same time, the writing means writes the same operation data in a memory means corresponding to the data carrier.

After the completion of work, the user makes a management means conduct reading on the data carrier. In this case, when the management means reads operation data from the data carrier, the operation data stored in the data carrier is erased.

Similarly, when the data carrier in which operation data is stored is lost, the user writes loss the lost information from the lost data carrier in a replacement data carrier using the management means.

When the replacement data carrier is set at a predetermined position of the vehicle, the writing means writes operation data stored in the memory means corresponding to the lost data carrier into the replacement data carrier. In this case, the writing means makes the operation data corresponding to the lost data carrier correspond to the replacement data carrier.

Accordingly, when the operation data stored in the replacement data carrier is read by the management means, it is possible to read and manage the operation data that was stored in the lost data carrier.

In the above arrangement, the memory means has an operation data backup area corresponding to the data carrier, and when the operation data stored in the operation data backup area of the memory means corresponding to the lost data, carrier is written in the replacement data carrier, both are made to correspond to each other by moving the operation data to an operation data backup area of the memory means corresponding to the data carrier and storing the operation data in the operation data backup area.

According to the above arrangement, a relation between the operation data stored in the memory means and the data carrier can be managed according to the memory area which is made to correspond to the data carrier. Therefore, it becomes easy to establish a relationship between the operation data stored in the memory means and the operation data stored in the data carrier. Accordingly, it is possible to manage the operation data easily.

Each data carrier can be distinguished by storing a corresponding identification number.

Because each data carrier can be distinguished by its corresponding identification number, the writing means can easily distinguish a particular data carrier by reading the identification number from the data carrier. Each data carrier is originally provided with a data storing function so it is unnecessary to provide separate means for storing data.

The corresponding identification number for each data carrier as stored in the data carrier system is also used with an immobilizer system associated with the vehicle ignition system.

Due to the above arrangement, the data carrier system and the immobilizer system can be easily combined with each other.

BRIEF DESCRIPTION OF THE DRAWINGS

FIG. 3 is a view showing a content stored in a non-volatile memory of an ECU of a vehicle;

FIG. 8 is a view corresponding to FIG. 7 for explaining a movement of data when a key is lost.

DETAILED DESCRIPTION OF PREFERRED EMBODIMENTS

Figure 1:
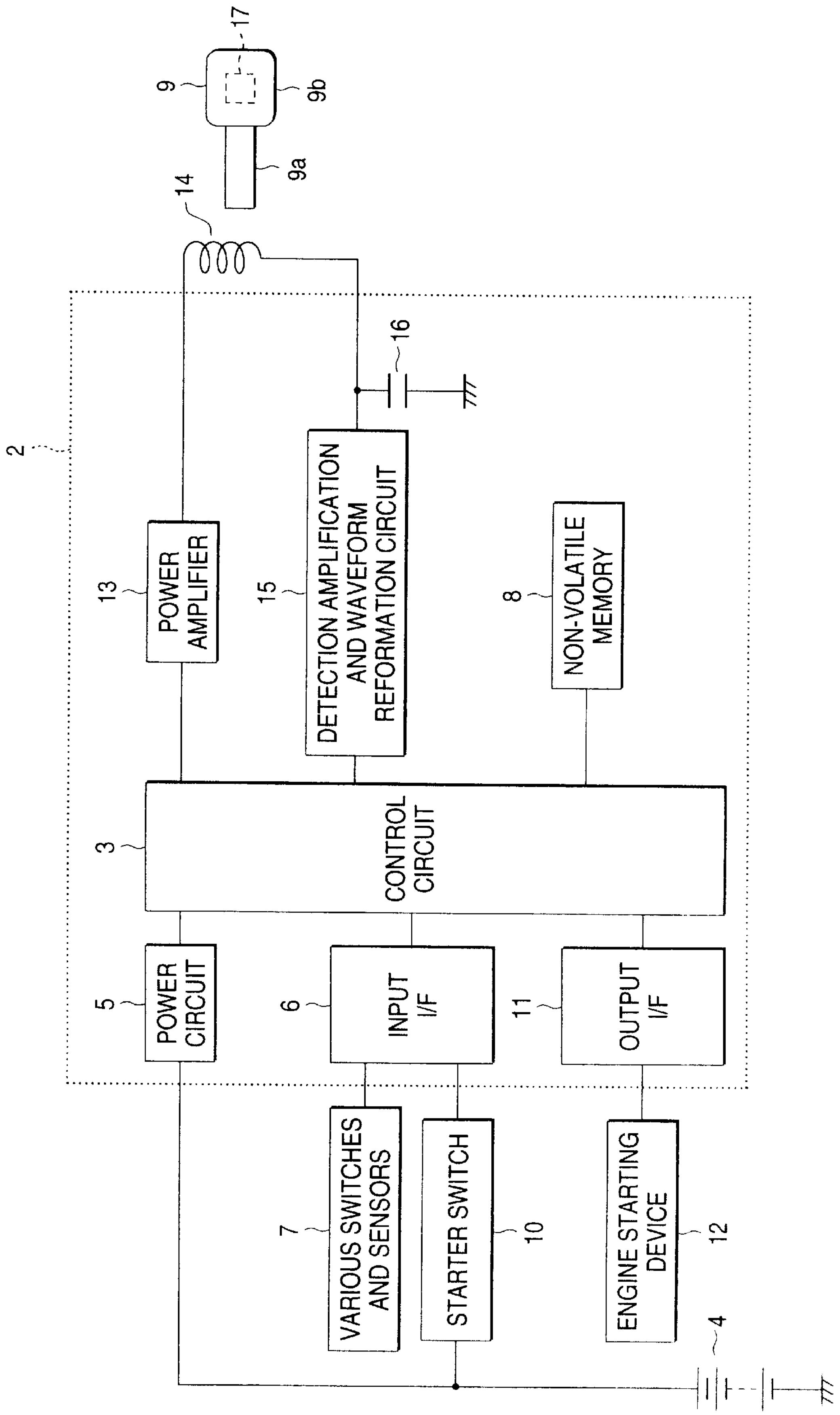
FIG. 1 is a view showing a block diagram of a vehicle of an embodiment of the present invention.

Referring to the drawings, an embodiment to which the present invention is applied to operation control of it construction vehicle will be explained below.

Figure 2:
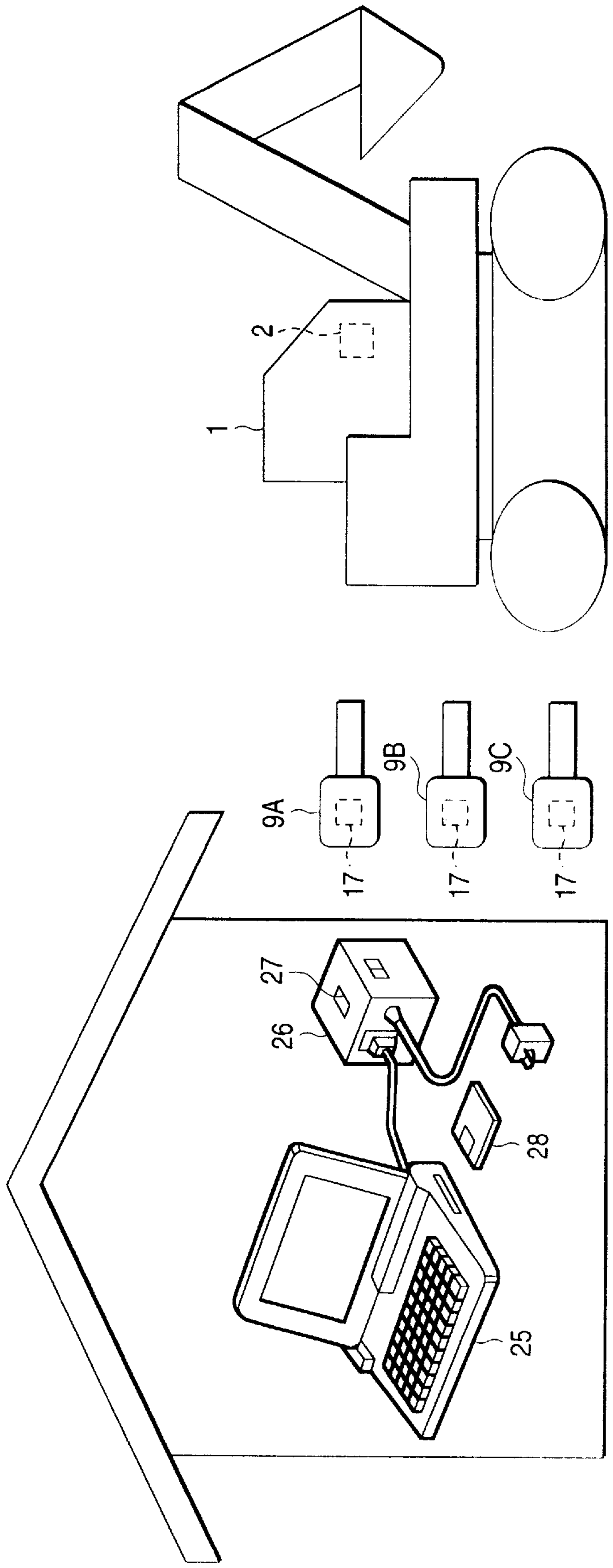
FIG. 2 is a schematic illustration showing an outline of an overall arrangement of a system.

In FIG. 2 showing an overall arrangement, ECU (Electric, Control Unit) 2 for controlling a vehicle is mounted on a construction vehicle 1.

As shown in FIG. 1, ECU 2 of a vehicle includes a control circuit 3 composed of a microcomputer. A predetermined voltage is given to the control circuit 3, which corresponds to a writing means, from a battery 4 mounted on the vehicle 1 via a power supply circuit 5. An input interface 6 is connected with various switches and sensors 7 such as an alternator, vehicle speed sensor and brake switch which are mounted on the construction vehicle 1. The control circuit 3 judges states of operation of various units via the input interface 6.

According to information sent from various switches and sensors 7 inputted via the input interface 6, the control circuit 3 successively writes operation data (engine start time, engine stop time, running speed, number of braking motions, and various data in the case of running (work, time, fuel information, fare of toll roads and information of abnormality of vehicle sensors)) in a non-volatile memory 8 which corresponds to a memory means.

A memory area corresponding to a having a built-in memory key 9, which corresponds to a data carrier, is set in this non-volatile memory 8. This key 9 having a built-in memory is simply referred to as a key in this specification hereinafter. The key 9 can include a first key 9A, second key 9B and third key 9C as shown in FIG. 2. Accordingly, memory areas corresponding to the keys 9A to 9C are set in the non-volatile memory 8.

As shown in FIG. 3, the memory area can include an ID code memory area, R/W renewal information memory area, memory area of start of writing address of a key, key loss information memory area, and operation data backup area. In this case, in ID code memory area, ID code previously stored in the key 9 is stored. In the R/W renewal information memory area, the number of reading motions of the operation data temporarily stored in the key 9 is stored. In the memory area of start of writing address of a key, a top address of the writable memory area is stored. In the key loss information memory area, information of whether or not a key is lost is stored and also ID code of a lost key is stored. In the backup data memory area, the same operation data as the operation data written in the key 9 used for starting the engine of the construction vehicle 1 is stored.

When the control circuit 3 detects via the input interface 6 that the starter switch 10 has been turned on, the control circuit 3 gives a permission of start to the engine starter 12 via the output interface 11 and transmits operation data successively to the antenna coil 14 via the power amplifier 13. At the same time, the control circuit 3 writes the same operation data in the non-volatile memory 8. A data signal received by the antenna coil 14 is inputted into the control circuit 3 via the detection, amplification and waveform formation circuit 15. In this case, a resonance circuit is formed by the antenna coil 14 and the condenser 16.

The above antenna coil 14 is arranged corresponding to an ignition key cylinder not shown in the drawing. When the control circuit 3 turns the power amplifier on and off according to a control program, an electric power signal is transmitted from the antenna coil 14.

In this connection, when the ignition key cylinder is operated, the starter switch 10 can be set at OFF-position, ACC-position, ON-position and START-position.

As shown in FIG. 1, a key 9 is provided which is a data carrier for temporarily storing operation data transmitted from ECU 2 of a vehicle composed as described above. This key 9 is composed of a key body 9*a* and a key grip 9*b*. A transponder 17 is built in the key grip 9*b*.

Figure 4:
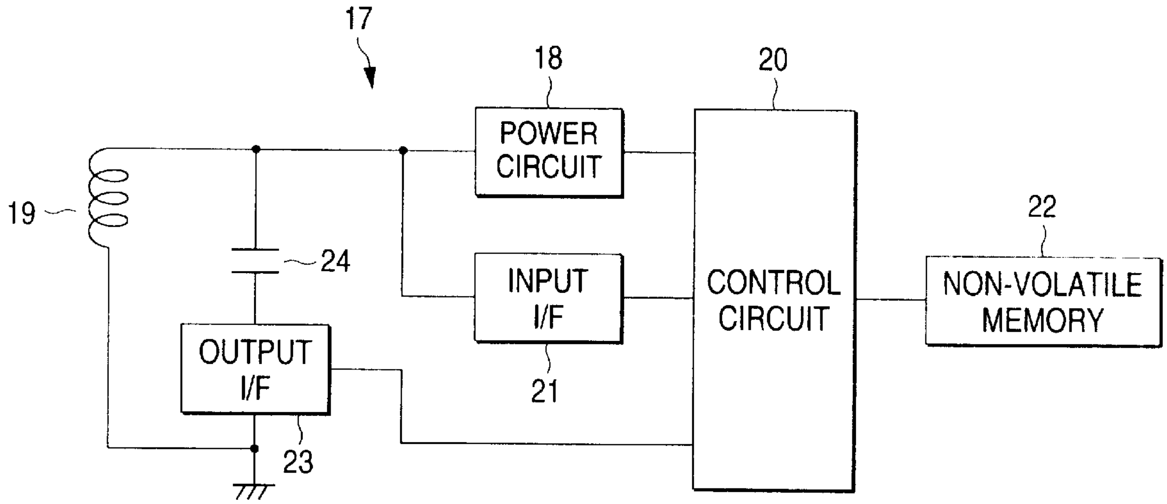
FIG. 4 is an illustration showing an outline of an electrical arrangement of a transponder.

FIG. 4 is a view showing an electrical structure of the transponder 17. In FIG. 4, the power circuit 18 rectifies and smoothes an electrical power signal received by the antenna coil 19, so that DC voltage is generated and given to the control circuit 20. This control circuit 20 is mainly composed of a microcomputer. A data signal contained in an electrical power signal is discriminated and inputted into the control circuit 20 via the input interface 21, and data judged according to the inputted data signal is stored in the non-volatile memory 22. The control circuit 20 changes impedance of a resonance circuit composed of the antenna coil 19 and the condenser 24 via the output interface 23 so that the electrical power signal can be modulated. In this way, the control circuit 20 transmits data stored in the non-volatile memory 22.

Figure 5:
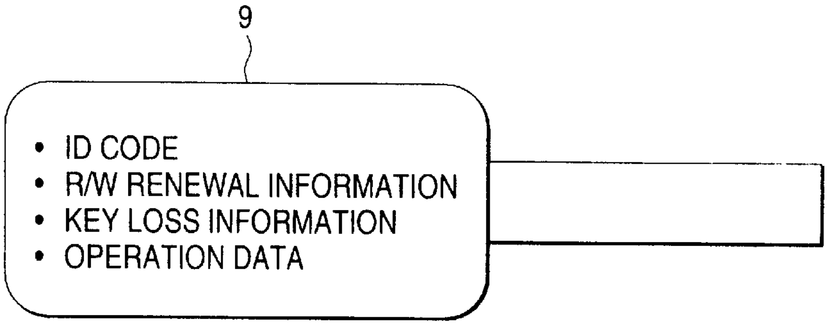
FIG. 5 is a view showing a content stored in a non-volatile memory of the transponder.

As shown in FIG. 5, the non-volatile memory 22 includes ID code memory area peculiar to the key, R/W renewal information memory area, key loss information memory area, and operation data memory area. In this case, an ID peculiar to the key is previously stored in the ID code memory area. The number of reading motions of operation data stored in the operation data memory area is stored in the R/W renewal information memory area. Key loss information showing whether or not a key is lost and also showing ID code of a lost key is stored in the key loss information memory area. Operation data is successively stored in the operation data memory area at each predetermined time.

Under the condition that the key 9 is inserted into the ignition key cylinder of the vehicle, the antenna coil 14 on the vehicle side and the antenna coil 19 on the key side are electromagnetically connected with each other, and an electrical power signal is transmitted from the antenna coil 14 on the vehicle side to the antenna coil 19 on the key side under a non-contact condition. In this connection, a resonance frequency of the resonance circuit composed of the antenna coil 19 and the condenser 24 is set at a value equal to the frequency band of the electric power signal transmitted from the vehicle side.

When impedance of the resonance circuit composed of the antenna coil 14 and the condenser 16 is changed, the control circuit 3 modulates and transmits the electrical power signal via the power amplifier 13.

The detection, amplification and waveform formation circuit 15 reforms a waveform of the electrical power signal sent from the resonance circuit and discriminates data contained in the electrical power signal.

On the other hand, a personal computer 25, which corresponds to a management means and loss information writing means and is referred to as a personal computer hereinafter, is arranged in an office as shown in FIG. 2. A reader/writer 26, which will be R/W device hereinafter, is connected with this personal computer 25.

R/W device 26 is connected with the personal computer 25 via a serial interface. Therefore, it is possible to give and receive data between R/W device 26 and the personal computer 25. An antenna coil not shown in the drawing is built in R/W device 26. Under the condition that the key 9 is inserted into the key insertion hole 27, the antenna coil 14 and the antenna coil 19 on the key 9 side are electromagnetically connected with each other in a non-contact condition.

R/W device 26 transmits an electrical power signal from the antenna coil not shown to the antenna coil 19 on the key 9 side according to a command signal transmitted from the personal computer 25. Also, R/W device 26 judges data, which has been transmitted from the key 9, according to a signal level of the electrical power signal.

The personal computer 25 includes a hard disk device and writes operation data, which has been read out from the key 9 by R/W device 26 according to the operation conducted by a user, on the hard disk or an external memory medium 28 such as a floppy disk corresponding to ID code. At this time, the personal computer 25 erases operation data stored in the key 9 via R/W device 26 and further makes an increment of the number of reading motions of R/W renewal information.

Next, operation of the above arrangement will be explained below.

Figure 6:
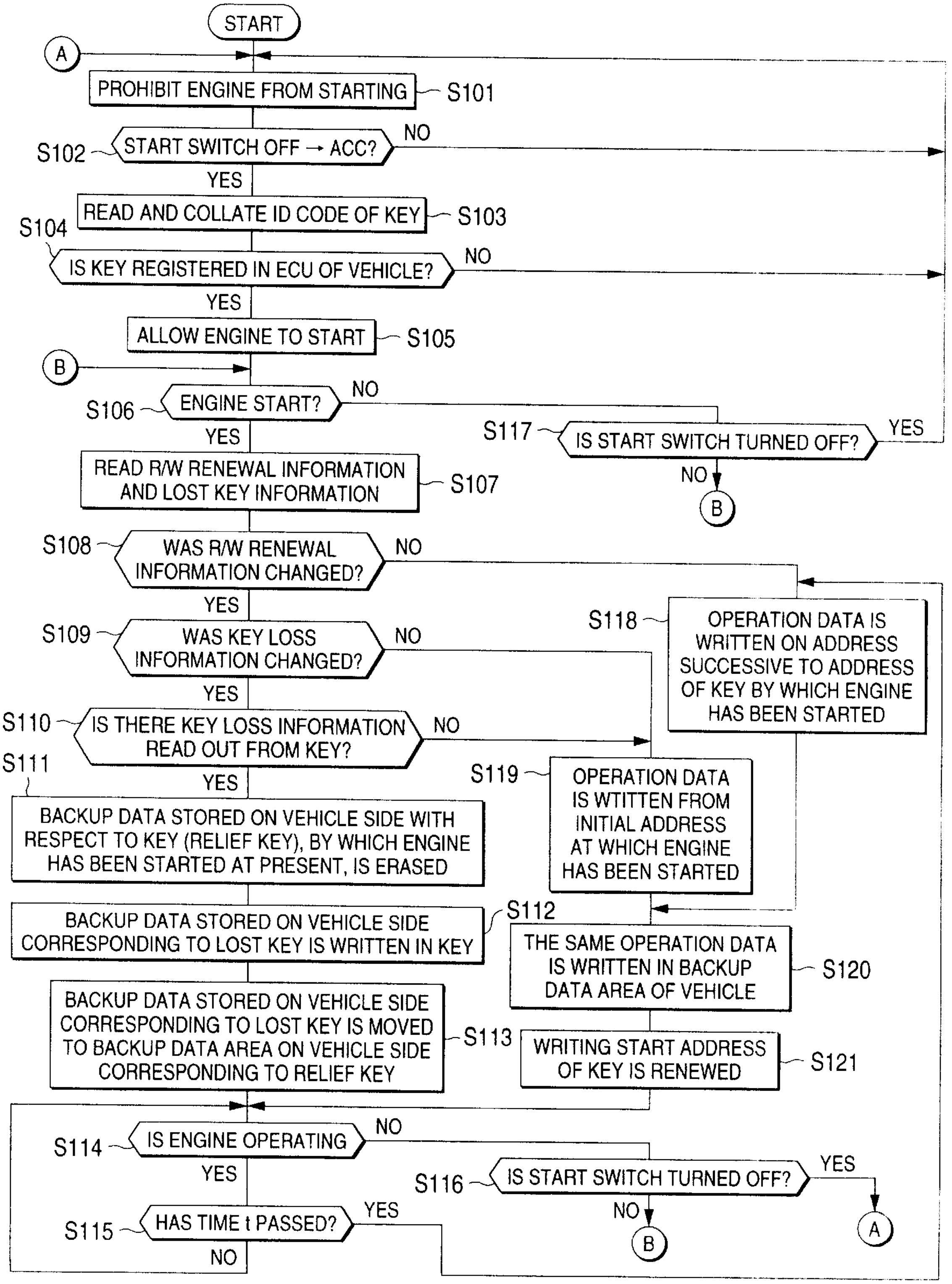
FIG. 6 is a flow chart showing the functions of an ECU of a vehicle.

FIG. 6 is a flow chart showing motions of ECU 2 of a vehicle. In this flow chart of FIG. 6, in the initial stage, ECU 2 of a vehicle judges whether or not a starter switch 10 is operated from OFF-position to ACC-position under the condition that an engine starting device 12 of the engine is prohibited from starting (S1O1).

When a worker operates a construction vehicle 1, the worker carries, for example, a first key 9A and gets into the a construction vehicle 1. In order to start the engine, the worker inserts the first key 9A into the ignition key cylinder and operates it from OFF-position to ACC-position (S102).

At this time, ECU 2 of a vehicle reads and collates ID code stored in the first key 9A (S103). When this ID code is previously registered (S104: YES), the engine starting device 12 is allowed to start the engine (S105).

When the worker operates the first key 9A so as to change the ignition key cylinder from ACC-position to START-position, the engine starting device 12 turns on the starter switch 10 under the condition that the engine is allowed to start. In this way, the engine is started.

When the engine is started by the engine starting device 12 as described above (S106: YES), ECU 2 of a vehicle reads R/W renewal information and key loss information from the first key 9A (S107).

In this case, when operation data stored in the operation data memory area of the first key 9A concerned was read and erased by the personal computer 25, R/W renewal information of the first key 9A is subjected to an increment. Therefore, R/W renewal information is different from a counted value which was read last time. When operation data was not read and erased by the personal computer 25, the counted value of R/W renewal information is not subjected to an increment. Therefore, in this case, the counted value of R/W renewal information is the same as that read last time.

When the counted value of R/W renewal information coincides with that of the last time (S108: NO), ECU 2 of a vehicle judges that operation data area has not been erased. Then, ECU 2 of a vehicle writes operation data according to the start address stored in the writing start address memory area of the operation data memory area of the first key 9A (S118). When R/W renewal information does not coincide with that of the last time (S108: YES), ECU 2 of a vehicle judges that operation data area was erased, and it is confirmed that the key loss information was not changed (S109: NO). Then, ECU 2 of a vehicle writes operation data according to the first address in the operation data memory area of the first key 9A (S119).

Successively, the same operation data as that written in the first key 9A is written in the operation backup area of the non-volatile memory 9 corresponding to the first key 9A (S120), and then the writing start address is renewed (S121).

That is, when the engine is started, the engine start time is stored in an area, in which data can be stored, of the operation data memory area of the first key 9A, and at the same time, in the non-volatile memory 8, the engine start time is also stored in an area, in which data can be stored, of the operation data backup area corresponding to the first key 9A.

ECU 2 of a vehicle writes operation data in the first key 9A when the program moves to step S118 each time a predetermined period of time t passes (S115: YES) in the engine operation (S114: YES), and at the same time, the same operation data is also written in the operation data backup area of the non-volatile memory 8 corresponding to the first key 9A.

Due to the above operation, the same operation data is successively written in the first key 9A and the memory area of the non-volatile memory 8 corresponding to the first key 9A.

When work of the day is completed, the worker operates the first key 9A and turns off the ignition key cylinder to OFF-position, so that the engine starting device 12 stops the engine. When the engine is stopped (S114: NO), ECU 2 of a vehicle confirms that the starter switch 10 is located at OFF-position (S116: YES), and the engine is prohibited from starting when the program proceeds to step S101.

After the engine of the construction vehicle 1 has been stopped as described above, the worker pulls out the first key 9A from the ignition key cylinder and sets the first key 9A in R/W device 26 of the personal computer 25 in the office. Under the above condition, the personal computer 25 is operated. Due to the foregoing, it becomes possible to make a daily report and conduct personnel management. The daily report and personnel management may be stored in the hard disk or the floppy disk 28 when necessary.

In the same manner as that described above, when the worker starts the engine of the construction vehicle 1 with the second key 9B or the third key 9C, it is possible to read and control operation data of the construction vehicle by the personal computer 25 while the key 9B or 9C is used as a medium.

In this connection, for example, when the key 9, in which operation data has been stored, is lost, it becomes impossible to read the operation data stored in the key 9. Therefore, the operation data can not be accurately managed.

Accordingly, in this embodiment, when the key 9 is lost, another key 9 is used as a replacement, and operation data stored in the lost key 9 can be managed as follows.

Explanation will be made into a case in which the first key 9A is lost and the second key 9B is used as a replacement. In this case, at the point of time when the first key 9A has been lost, as show in FIG. 7, operation data (shown by arrow A) corresponding to the first key 9A is stored in the non-volatile memory 8 of ECU 2 of a vehicle, and at the same time, operation data (shown by arrow B) corresponding to the second key 9B is also stored in the non-volatile memory 8.

In the office, the worker inserts the second key 9B into R/W device 26 and operates the personal computer 25. In the above operation of the personal computer 25, information that the first key was lost is stored in the key loss information memory area of the second key 9B, and also ID code of the first key 9A is stored in the key loss information memory area of the second key 9B in order to show that the lost key is the first key 9A. In this case, when the personal computer 25 stores the key loss information in the key loss information memory area of the second key 9B, operation data stored in the second key 9B is read at the same time.

Then, the worker starts the engine with the second key 9B in which the key loss information is stored. Then, ECU 2 of a vehicle confirms that operation data is read out according to R/W renewal information stored in the second key 9B (S108: YES). At the same time, after it has been confirmed whether or not the key loss information stored in the second key 9B was changed (S109), it is confirmed whether or not the key loss information showing that a key is lost is stored (S110).

Figure 7:
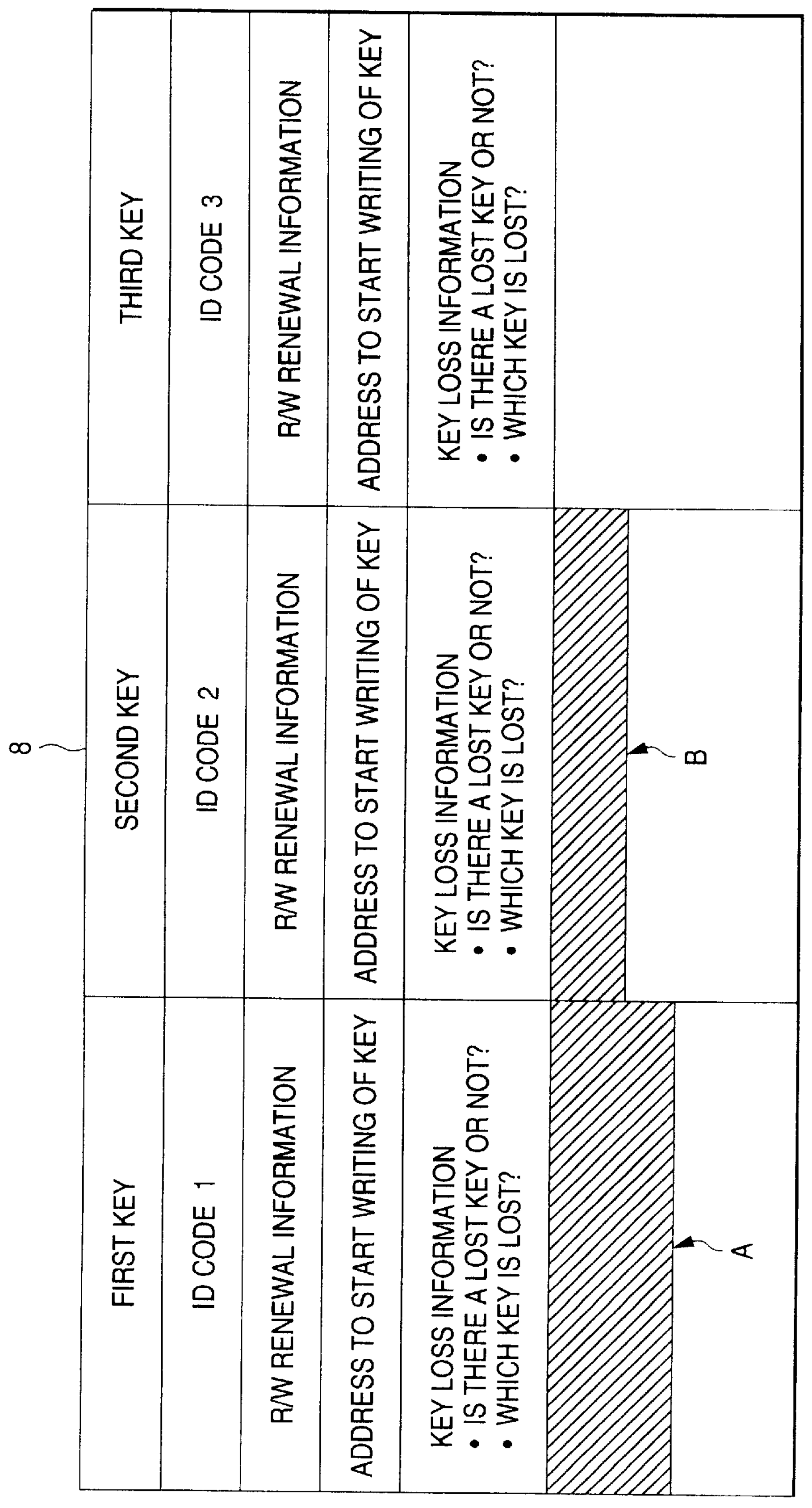
FIG. 7 is a view corresponding to FIG. 3 for explaining an action.

In this case, the key loss information showing that a key is lost is stored (S110). Therefore, it is judged that the second key 9B is being used as a replacement key. Accordingly, backup data stored in the operation backup area in the non-volatile memory 8 corresponding to the second key 9B is erased (S111). Due to the foregoing, operation data shown by arrow B in FIG. 7 is erased.

Successively, backup data stored in the operation data backup area of the non-volatile memory 8 corresponding to the lost first key 9A is written in the operation data memory area of the second key 9B (S112). The backup data is moved to the operation data backup area corresponding to the second key 9B and stored (S113). At this time, the key writing start addresses corresponding to the first key 9A and the second key 9B are renewed.

Due to the above operation, backup data stored in the operation backup area in the non-volatile memory 8 corresponding to the first key 9A is stored in the second key 9B. At the same time, as shown in FIG. 8, the same backup data is also stored in the operation data backup area corresponding to the second key 9B.

When construction work conducted by the construction vehicle 1 proceeds, operation data is successively stored in the successive area in the operation data memory area of the second key 9*b* in the manner described above. At the same time, the same operation data is successively stored in the successive area in the operation data backup area of the non-volatile memory 8 corresponding to the second key 9B.

When work is completed, the worker operates the second key 9B and stops the engine. Then, the personal computer 25 reads operation data stored in the second key 9B via R/W device 26. In this case, when the personal computer 25 completes the reading of operation data from the second key 9B and writes the operation data on a hard disk or an external memory medium 28 such as a floppy disk, operation data stored in the second key 9B is erased. At this time, key loss information of "no key is lost" is stored in the second key 9B.

Accordingly, the same backup data as the operation data stored in the lost key 9A can be read from ECU 2 of a vehicle by the personal computer 25 while the second key 9*b* is used as a medium. Therefore, operation data stored in the lost key 9A can be positively managed.

In this connection, in the case where the lost first key 9A has been found, the personal computer 25 is operated, and information that no key has been lost is stored in the loss information memory area of the second key 9B, and at the same time, the loss information showing that the first key 9A has been lost is erased.

According to this embodiment, operation data of a vehicle is written in the key 9 used for starting the engine, and at the same time, the same operation data is stored in the non-volatile memory 9 of ECU 3 for a vehicle corresponding to the key 9. When the key 9 is lost, operation data stored in the non-volatile memory 8 corresponding to the lost key 9 is stored in the key 9 used as a replacement. Accordingly, different from a structure in which operation data is simply written in the key, operation data stored in the lost key 9 is read from ECU 2 of a vehicle by the personal computer 25 via the key 9 used as a replacement. Therefore, operation data can be positively managed.

In this case, when operation data stored in the operation data backup area in the non-volatile memory 8 corresponding to the lost key 9 is written in the key 9 used as a replacement, the operation data is moved to the operation data backup area corresponding to the key 9 used as a replacement. Therefore, a relation between the operation data and the key 9 can be easily and positively renewed.

The present invention is not limited to the above specific embodiment, but the following variations may be made.

In the above embodiment, when operation data corresponding to the lost key 9 is written in the key used for replacement, the operation data is moved to the operation data backup area corresponding to the key 9 used for replacement. Instead of that, the operation data backup area may be provided in common, and a relation between the stored operation data and the key 9 may be stored in the common area. In this case, when the key 9 is lost, it is stored that the operation data written in the key 9 used for relief is of the lost key 9.

Instead of the key 9 used as a medium for storing data temporarily, IC card, memory card or handy terminal in which memory is built in may be used.

As can be clearly seen in the above explanations, according to the data carrier of the present invention, the following excellent effects can be provided. When operation data of a vehicle is stored in the data carrier, the operation data is simultaneously stored in a memory means corresponding to the data carrier, and when the data carrier is lost, the operation data of the lost data carrier, which is stored in the memory means, is stored in a data carrier used as a replacement by storing the loss information of the lost data carrier in the data carrier used as a replacement. Therefore, it is possible to read the operation data stored in the lost data carrier by using the replacement data carrier as a medium. Accordingly, even if the data carrier is lost, the operation data can be positively managed.

FIG. 3 a First key
b Second key
c Third key
d ID code 1
e ID code 2
f ID code 3
g R/W renewal information
h R/W renewal information
i R/W renewal information
j Address to start writing of key
k Address to start writing of key l Address to start writing of key
m Key loss information
Is there a lost key or not?
Which key is lost?
n Key loss information
Is there a lost key or not?
Which key is lost?
o Key loss information
Is there a lost key or not?
Which key is lost?
p Operation data
Backup area
q Operation data
Backup area
r Operation data
Backup area

FIG. 6

Start
S101 Prohibit engine from starting.
S102 Start switch
OFF→ACC?
S103 Read and collate ID code of key
S104 Is key registered in ECU of vehicle?
S105 Allow engine to start.
S106 Engine start?
S107 Read R/W renewal information and lost key information.
S108 Was R/W renewal information changed?
S109 Was key loss information changed?
S110 Is there key loss information read out from key?
S112 Backup data stored on vehicle side with respect to key (relief key), by which engine has been started at present, is erased.
S112 Backup data stored on vehicle side corresponding to lost key is written in key.
S113 Backup data stored on vehicle side corresponding to lost key is moved to backup data area on vehicle side corresponding to relief key.
S114 Is engine operating?
S115 Has time t passed?
S116 Is start switch turned off?
S117 Is start switch turned off?
S118 Operation data is written on address successive to address of key by which engines has been started.
S119 Operation data is written from initial address at which engine has been started.
S120 The same operation data is written in backup data area of vehicle.
S121 writing start address of key is renewed.

FIG. 7 a First key
b Second key
c Third key
d ID code 1
e ID code 2
f ID code 3
g R/W renewal information
h R/W renewal information
i R/W renewal information
j Address to start writing of key
k Address to start writing of key
1 Address to start writing of key
m Key loss information
Is there a lost key or not?
Which key is lost?
n Key loss information
Is there a lost key or not?
Which key is lost?
o Key loss information
Is there a lost key or not?
Which key is lost?

FIG. 8 a First key
b Second key
c Third key
d ID code 1
e ID code 2
f ID code 3
g R/W renewal information
h R/W renewal information
i R/W renewal information
j Address to start writing of key
k Address to start writing of key
l Address to start writing of key
m Key loss information
Is there a lost key or not?
Which key is lost?
n Key loss information
Is there a lost key or not?
Which key is lost?
o Key loss information
Is there a lost key or not?
Which key is lost?

What is claimed is:

1. A data carrier system comprising:

a plurality of portable data carriers which are distinguishable from each other;

a writing means for writing operation data of a vehicle into a memory area of the data carriers in which the operation data can be written under the condition that the data carriers are set at a predetermined position of the vehicle, and for writing the operation data of the vehicle corresponding to the operation data written into a memory area of a particular data carrier in a first memory means;

a management means for reading the operation data stored in the data carriers, and for erasing the operation data stored in the data carriers; and a lost information writing means for writing the identification of a lost data carrier, into a replacement data carrier, wherein the writing means writes the operation data of the vehicle stored in the first memory means corresponding to the lost data carrier into the replacement data carrier when the loss information which shows the identification of the lost data carrier is stored in the replacement data carrier, and the operation data is made to correspond to the replacement data carrier.

2. The data carrier system according to claim 1, wherein the first memory means has a first operation data backup area corresponding to the lost data carrier, and a second operation data backup area corresponding to the replacement data carrier, the operation data stored in the first operation data backup area of the first memory means corresponding to the lost data carrier being written in the replacement data carrier, and being made to correspond to the replacement data carrier by moving the operation data from the first operation data backup area to the second operation data backup area of the first memory means and by storing the operation data in the second operation data backup area.

3. The data carrier system according to claim 1, wherein the data carriers are distinguished from each other by storing a corresponding identification number for each data carrier in a memory of each data carrier.

4. The data carrier system according to claim 2, wherein the data carriers are distinguished from each other by storing a corresponding identification number for each data carrier in a memory area of each data carrier.

5. The data carrier system according to claim 3, wherein the corresponding identification numbers stored in the data carrier system are also used for an immobilizer system to allow the vehicle to start.

6. The data carrier system according to claim 4, wherein the corresponding identification numbers stored in the data carrier system are also used for an immobilizer system to allow the vehicle to start.

* * * * *